United States Patent [19]

Tallman

[11] Patent Number: 5,205,586

[45] Date of Patent: Apr. 27, 1993

[54] MULTI-PURPOSE STABILIZER ASSEMBLY

[75] Inventor: Andrew L. Tallman, San Pedro, Calif.

[73] Assignee: Norco Industries, Inc., Compton, Calif.

[21] Appl. No.: 772,630

[22] Filed: Oct. 7, 1991

Related U.S. Application Data

[63] Continuation of Ser. No. 545,141, Jun. 28, 1990, abandoned, which is a continuation of Ser. No. 326,972, Mar. 22, 1989, abandoned, which is a continuation-in-part of Ser. No. 163,197, Feb. 26, 1988, abandoned, which is a continuation-in-part of Ser. No. 920,680, Oct. 19, 1986, abandoned.

[51] Int. Cl.⁵ ............................................. B60S 9/02
[52] U.S. Cl. ................................. 280/764.1; 254/424
[58] Field of Search ........................... 254/419, 424; 280/763.1, 764.1, 762, 765.1, 766.1

[56] References Cited

U.S. PATENT DOCUMENTS

| | | | |
|---|---|---|---|
| 2,358,488 | 9/1944 | Black | 254/419 |
| 3,475,008 | 10/1969 | Taylor | 254/424 |
| 3,565,396 | 2/1971 | Spear | 254/424 |
| 3,656,778 | 4/1972 | Bristol | 280/763.1 |
| 3,658,359 | 4/1972 | Claflin et al. | 254/419 |
| 3,722,948 | 3/1973 | Walsh et al. | 280/656 X |

Primary Examiner—Margaret A. Focarino
Assistant Examiner—Michael Mar
Attorney, Agent, or Firm—Fulwider, Patton, Lee & Utecht

[57] ABSTRACT

A multi-purpose structure for vehicles of the nature of house trailers makes use of a pair of telescoping beams which serve in part as a cross-member or beam beneath the floor of the trailer and also in part as guideways for trunnions which are attached to upper ends of the ground-engaging legs, the legs being those which serve as stabilizers when the vehicle is parked. The same telescoping beams additionally serve as housings for jack screw drives which are used to move the stabilizing legs between ground-engaging and stowed positions.

1 Claim, 4 Drawing Sheets

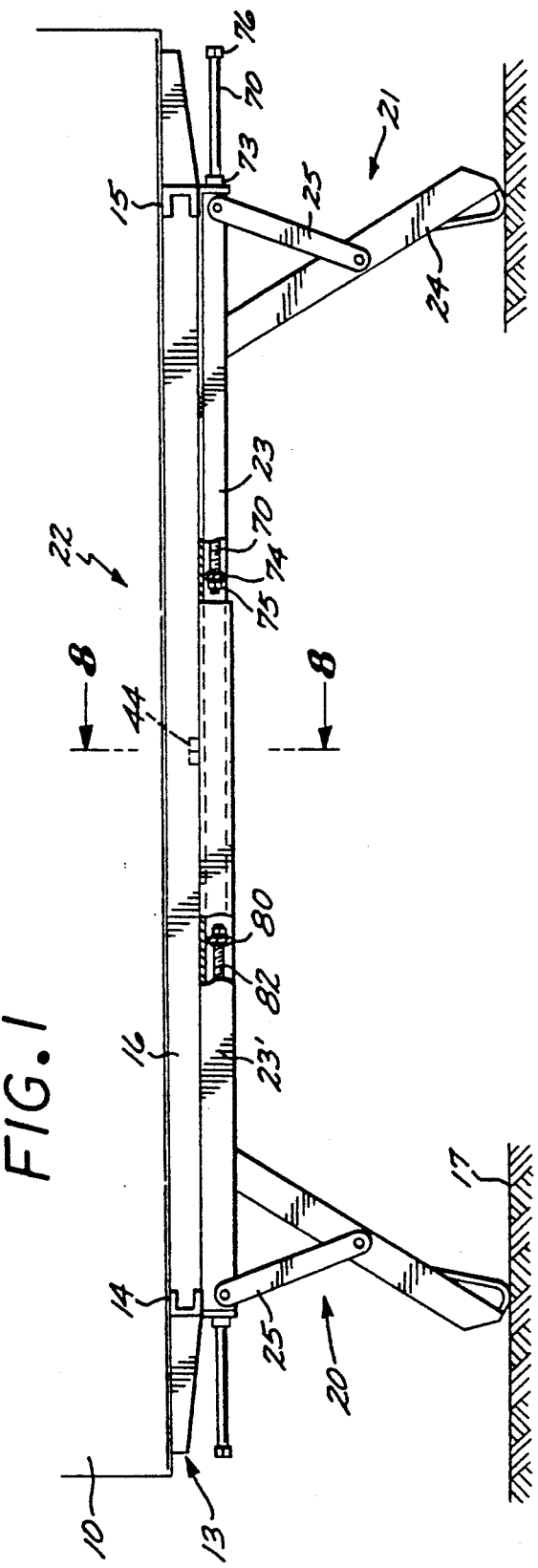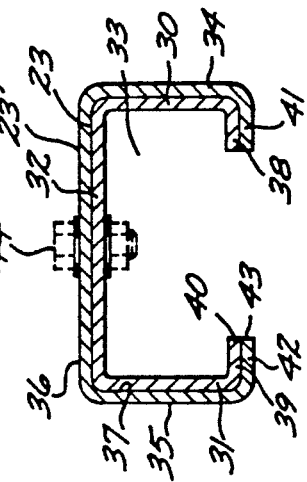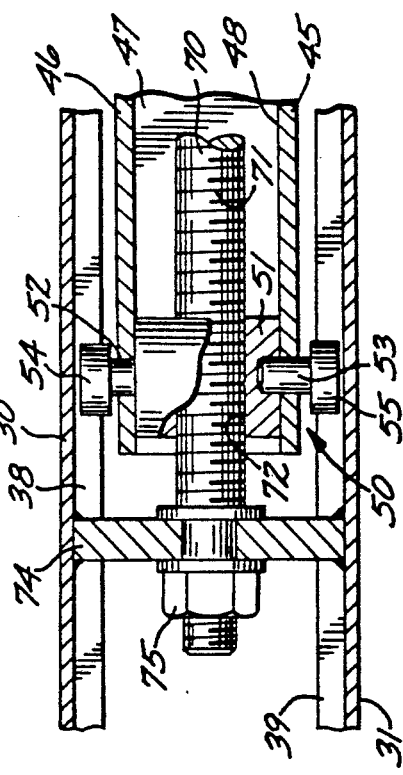

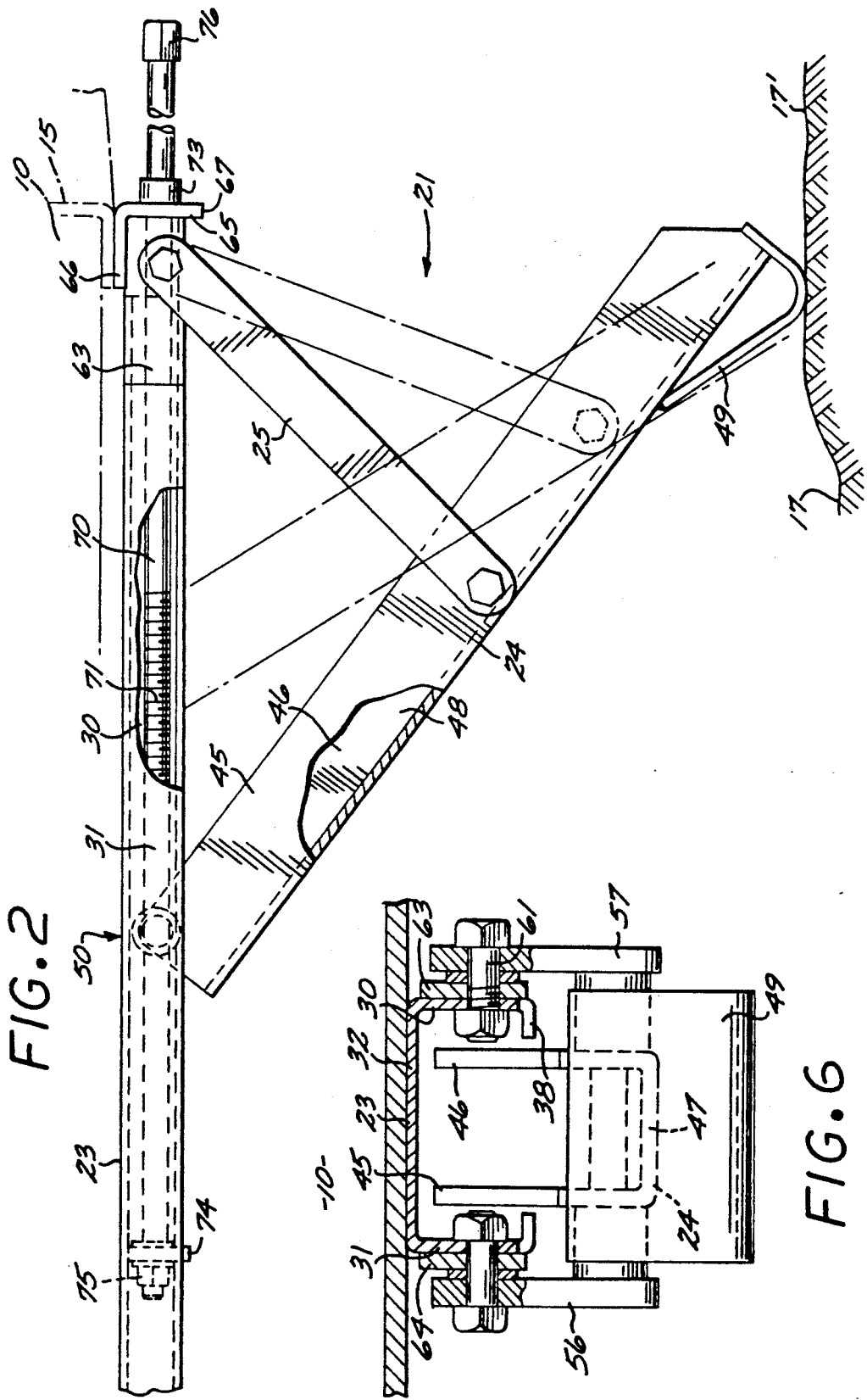

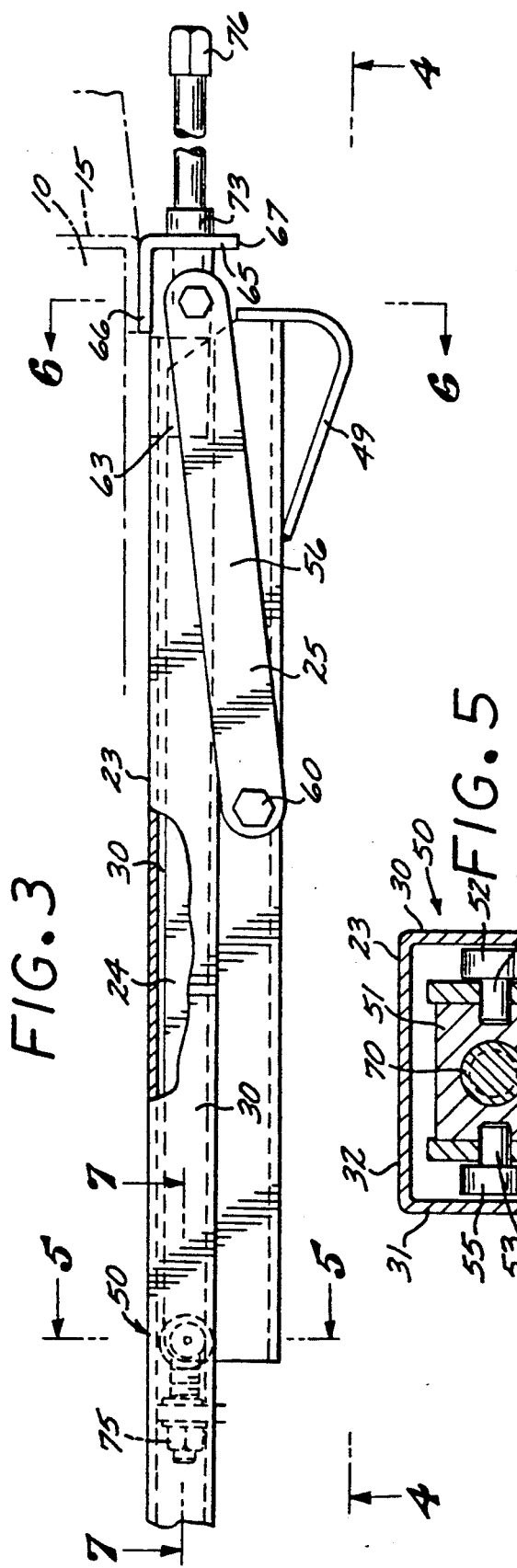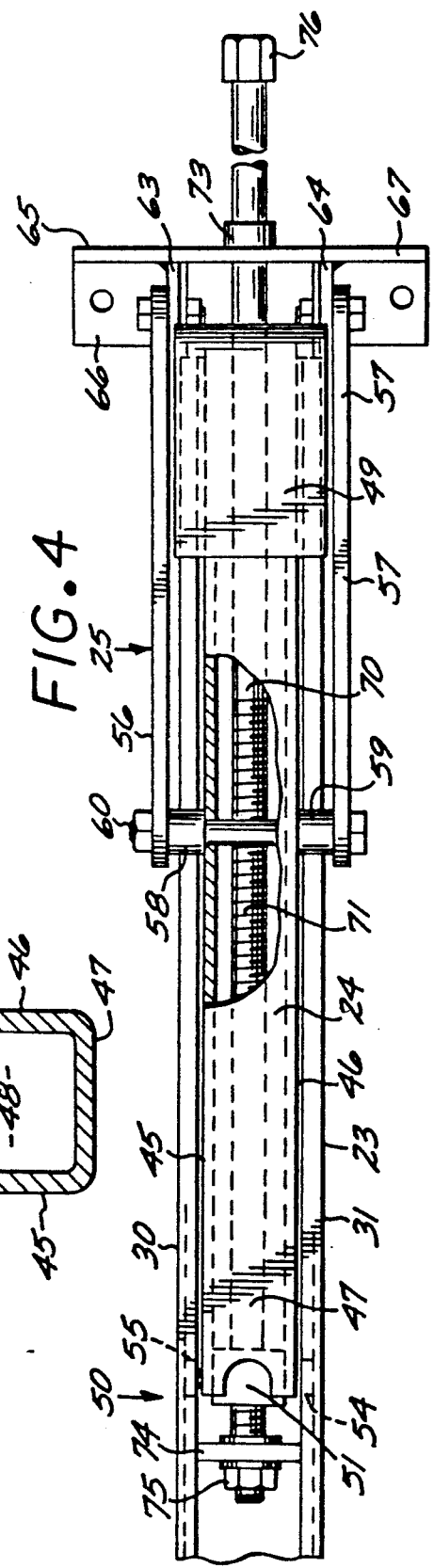

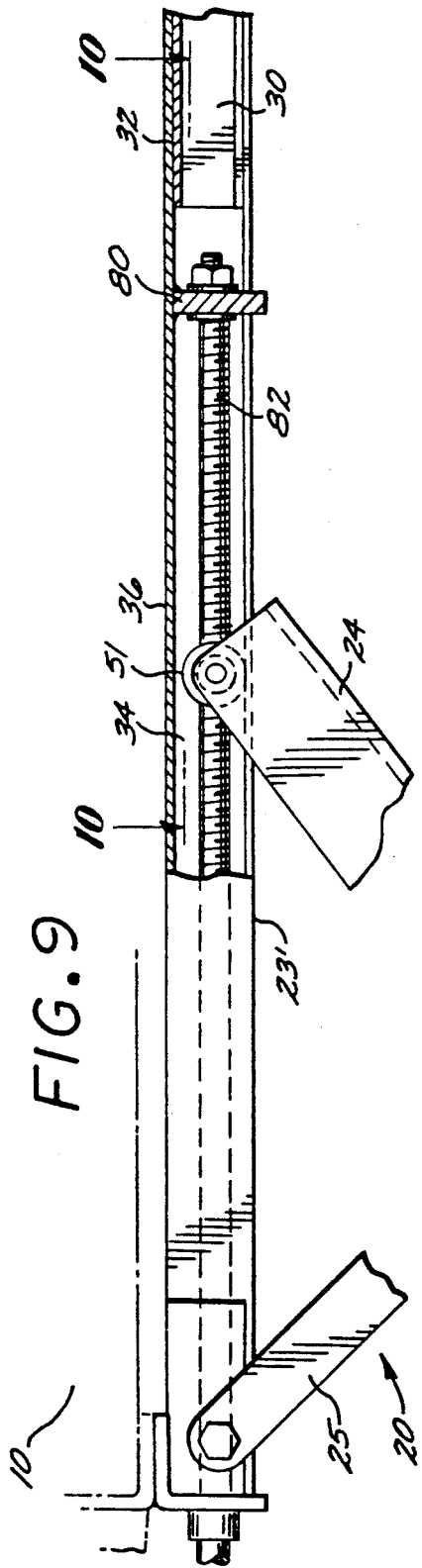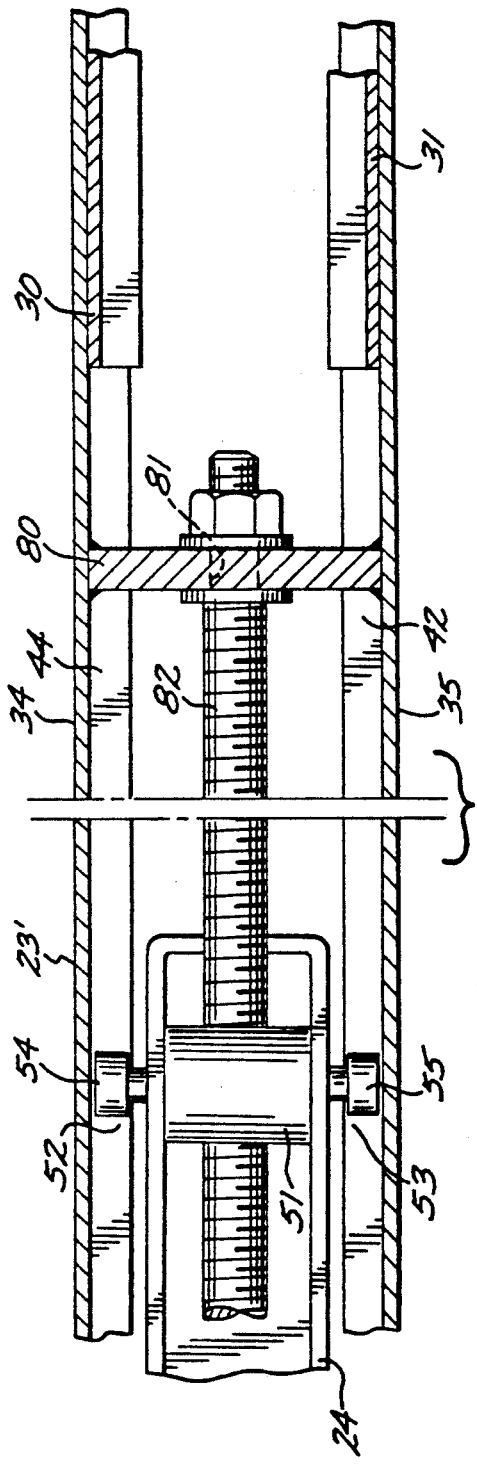

MULTI-PURPOSE STABILIZER ASSEMBLY

This is a continuation of application Ser. No. 07/545,141 filed on Jun. 28, 1990, now abandoned, which is a continuation of application Ser. No. 07/326,972 filed on Mar. 22, 1989, now abandoned, which is a continuation-in-part of application Ser. No. 07/163,197 filed on Feb. 26, 1988, now abandoned, which is a continuation-in-part of application Ser. No. 06/920,680 filed on Oct. 20, 1986, now abandoned.

As industry has progressed in the building of trailers, and particularly house trailers, there has been a marked trend toward simplification. This has been in part the result of experience but also need to hold costs at a competitive level in the face of accelerating prices for virtually all of the many individual items which must be included to make a salable vehicle.

One of the areas where the cost factor can be improved is that where structural expedients can be made to serve more than one purpose. Stabilizers have long been treated as accessory items even though, like a spare tire, they are, as a practical matter, always included as an extra part of the package. Even when supplied as part of the package, they have not heretofore been made part of the basic design and made to serve any purpose other than that of supplying stability and leveling when the vehicle is parked.

When a house trailer, for example, is parked for use as living quarters, occupants in moving about tend to rock the trailer an amount sufficient to cause discomfort and inconvenience. The invention here disclosed is a stabilizer attached beneath the trailer body with legs folded upwardly during travel over the highway and which can be cranked downwardly into ground-engaging position when the trailer is parked. In that way the stabilizers serve to prevent the trailer from rocking when used as living quarters. Other types of trailers have comparable needs. The stabilizer herein disclosed comprises left and right-hand units with load supporting channel members in telescoping engagement with each other so that they can be adjusted to trailer bodies of varying width, and attached as part of the underside of the trailer body at whatever location might be most advantageous, usually where there would need to be a cross-member for rigidity and strength.

Even though in relatively large trailer structures well equipped with shock absorbers the movement may not be great, any movement at all is often objectionable. Movement may also be the result of high winds where the trailer is parked.

It is therefore among the objects of the invention to provide a new and improved adjustable stabilizer for trailered vehicles which is substantially universal in its design so that it can be readily fixed to the undercarriage of a great variety of kinds and sizes of trailered vehicles and made part of the structure.

Another object of the invention is to provide a new and improved adjustable stabilizer of a substantially unitary or modular construction which when attached to an appropriate vehicle is immediately ready for operation.

Another object of the invention is to provide a new and improved adjustable stabilizer device where supporting members are such that they are in a telescopic arrangement thereby to make the device readily adjustable for vehicles of a wide variety of widths.

Still another object of the invention is to provide a new and improved adjustable stabilizer structure which can be permanently attached to trailers of different widths and undercarriage structure, the adjustable stabilizer being of such construction as to provide support throughout its entire upper surface, thereby to accommodate reinforcement for virtually any type of undercarriage and at the same time perform a dual function in the installation, serving also the need for stabilization and leveling when the vehicle is parked.

Still another object of the invention is to provide a new and improved adjustable stabilizer for trailer type vehicles of such character that it can be installed virtually anywhere on the frame.

Another object of the invention is to provide a new and improved adjustable stabilizer device wherein right and left-hand units fold compactly into a small compact overlapping package beneath the trailer when not in use and which can be readily extended to a proper stabilizing position by manipulation of a convenient crank shaft carried, if need be, adjacent the adjustable stabilizer itself.

With these and other objects in view, the invention consists in the construction, arrangement, and combination of the various parts of the device, whereby the objects contemplated are attained, as hereinafter set forth, pointed out in the appended claims, and illustrated in the accompanying drawings.

In the drawings:

FIG. 1 is a side elevational view of the stabilizer installation in operative position and partially broken away to show interior structure.

FIG. 2 is a fragmentary side elevational view of one of the stabilizers, partly broken away and in extended position.

FIG. 3 is a view similar to FIG. 2 but with the stabilizer in stowed position.

FIG. 4 is a bottom view partially broken away on the line 4—4 of FIG. 3.

FIG. 5 is a cross-sectional view on the line 5—5 of FIG. 3.

FIG. 6 is a cross-sectional view on the line 6—6 of FIG. 3.

FIG. 7 is a fragmentary sectional view on the line 7—7 of FIG. 3.

FIG. 8 is a cross-sectional view on the line 8—8 of FIG. 1.

FIG. 9 is a fragmentary side elevational view of the other stabilizer partially broken away and with parts shown as in the extended position.

FIG. 10 is a longitudinal sectional view on the line 10—10 of FIG. 9.

In an embodiment of the invention chosen for the purpose of illustration there is shown a portion of a typical trailer body, indicated generally by the reference character 10, which may be any one of a great variety of different kinds and of virtually any roadable width and length. Such trailers are conventionally trailed over the highways on wheels (not shown) and may be equipped with appropriate conventional shock absorbers and springs (not shown). For convenience in description, the trailer may be described as being provided with a frame 13 built in part of side channels 14, 15 and cross-members 16 for supporting the trailer floor structure. When the trailer is parked for living purposes, it is normally wheeled out to an appropriate supporting surface 17, either in a trailer park or at some other appropriate location and stabilizers extended as in FIGS. 1 and 2.

The invention here under consideration is that of an adjustably constructed stabilizer assembly which, in a form suited to installation beneath the frame 13, is a dual telescoping arrangement of left and right-hand units 20 and 21 and which, telescoped together and installed, may be identified as a stabilizer assembly 22.

The right-hand unit 21, taken as an example, and of which particulars are provided as in FIG. 2, consists of supporting parts, namely, a beam 23, a leg 24, and a movable stay 25 serving as a motorized actuator for extending and retracting the leg, and also serving as a brace when the leg is extended. More particularly, the beam 23 is a modified rectangular section consisting of side walls 30 and 31 separated by a web 32 forming between them an elongated pocket 33.

The left-hand unit 20 is similar except that the beam 23' consists of a modified rectangular section formed by side walls 34 and 35 separated by a web 36 forming an elongated pocket 37. The left-hand unit differs from the right-hand unit only to the extent that the pocket 37 of the left-hand beam 23' is sufficiently larger than the outside dimensions of the beam 23 of the right-hand unit so that the right-hand channel section can slide telescopingly into the left-hand channel section.

Of special consequence in the structure of the beam 23 are flanges 38 and 39 on the side opposite the web 32, separated as shown by the space 40. Similarly the left-hand beam 23' is provided with flanges 41 and 42 on the side opposite the web 36, separated as shown by a space 43 which is coincident with the space 40. There is a complete telescoping fit as a consequence of the structure described so that the individual beam sections 23 and 23' when joined act as a single continuous beam serving as a cross-member between the side channels 14, 15. A bolt 44 may be employed, if desired, to attach the beam sections 23, 23' together to provide a cross-member of desired length.

Further particulars of the right-hand unit, which are substantially duplicated by the left-hand unit, include forming the leg 24 from a channel section consisting of side walls 45 and 46 separated by a web 47 and providing a chamber 48. There is at one end of the leg 24 a footpiece or shoe 49.

At the end of the leg opposite the footpiece is a trunnion 50 of special construction. The trunion consists in part of a central cylindrical core 51 at opposite ends of which are pins 52 and 53 provided with respective heads 54 and 55. The adjacent side walls 46 and 45 of the leg are engaged by the corresponding pins 52 and 53. The heads of these pins are adapted to slide in slideways provided by the flanges 38 and 39, respectively. Pins 52 and 53 are separate and subject to attachment and removal from the cylindrical core 51. In use the heads provide a compact rugged mounting for the core in sliding engagement with the side walls 30, 31 and corresponding flanges 38, 39.

The stay 25 for the right-hand unit 21 as shown consists of a pair of structural members comprising strips 56 and 57. At the left end, as viewed in FIGS. 3 and 4, the strips are joined to bosses 58 and 59 which in turn are pivotally secured to respective side walls 46 and 45 of the corresponding right-hand leg 24 by means of a single bolt 60. The bolt 60 extends from one strip 57 through the side walls 45 and 46 to the other strip 56. At the other end of the stay, namely, the right-hand end, bolts 61 and 62 extend through the side walls 30 and 31 and respective spacers 63 and 64. The spacers in turn are secured by weldments to a transversely mounted angle section 65. One leg 66 of the angle section serves as an attachment to the side channel 15'. The other leg 67 is attached to adjacent ends of the respective side walls 30 and 31.

What may be termed a motor is embodied in a threaded shaft 70. External threads 71 at the left end threadedly engage a transverse internally threaded opening 72 through the cylindrical core 51 of the trunnion 50. The right end of the shaft 70 projects through the leg 67 and is anchored in place by a collar 73.

At the left-hand end of the threaded shaft 70 is a plate 74 which rotatably accommodates the shaft 70. The collar 73 is welded to the shaft and forms in effect a bearing which cooperates with a nut 75 at the left-hand end to secure the shaft 70 in its rotatable position. At the extreme right-hand end of the shaft 70 is a wrench hold 76. By welding side edges of the plate 74 to the side walls 30 and 31 of the web 32, the structural integrity of the beam 23 is materially improved.

For moving or extending the leg 24 from the collapsed position of FIG. 3 to the extended position of FIG. 1, the shaft 70 is rotated in the appropriate direction by applying a suitable wrench to the wrench hold 76 and rotating the shaft so that by reason of the threaded engagement of the external threads 71 of the shaft with the internal threads of the cylindrical core 51 of the trunnion 50, the trunnion is moved along a path from left to right, the heads 54, 55 sliding in the corresponding slideways formed by the flanges 38 and 39. This movement causes a shift in position of the left-hand end of the leg 24 and, by action of the stay 25, the right-hand end of the leg 24, provided as shown with the shoe 49, is tilted downwardly until it ultimately is moved into contact with the supporting surface 17. The wrench is then removed from the wrench hold 76 of the right-hand unit and applied in a similar fashion to the left-hand unit in order to extend the left-hand leg downwardly until it is also moved into contact with the supporting surface 17. Should there be an uneven portion 17' of the supporting surface, movement of the leg downwardly is effectively discontinued upon engagement with the uneven portion.

When the leg is to be collapsed to the folded position, rotation of the shaft 70 is reversed. It should be noted that in folded position the leg 24 is nested snugly against the beam in close parallel relationship and the strips 56 and 57 straddle the corresponding side walls of the channel section forming the beam, thereby to permit the compact parallel arrangement shown and described.

There is a comparable structure for the mounting and operation of the left-hand unit 20 with a modest but significant difference. A plate 80 extends between and is secured to side walls 34 and 35, and preferably also the web 36, by an appropriate weldment. In this way the structural integrity of the left-hand beam 23' is similarly improved.

As shown in FIG. 1, the plates 74 and 80 are located in the relative mid-portion of the stabilizer assembly 22. As a result, the mid-portion of the assembly shares in the structural integrity which is built into the beams 23, 23'. The result is improved service as a transverse beam as well as that of a stabilizer assembly.

There is in the plate 80 a centrally disposed opening 81 to accommodate a threaded shaft 82 for the left-hand unit 20. Because the side walls 34 and 35 are spaced wider apart than the side walls 30 and 31 on the right-hand side, heads 54 and 55 of corresponding pins 52 and 53 of the cylindrical core 51 are set at a wider distance apart so as to ride effectively within the larger beam 23'. A proper positioning can be made in the core at the time of assembly.

By reason of the telescoping arrangement of the substantially rectangular channel sections forming the beams, the left-hand and right-hand units 20 and 21 can be extended outwardly far enough to span the main frame of the trailer and then move inwardly toward each other until the angle section 63 is in snug alignment with the corresponding side channel 14 or 15, as the case may be. Once adjusted to proper width, appropriate holes may be drilled through the legs of the channels 14 and 15 and conventional screws, bolts, or a weldment used for attaching the angle sections 65 to the channels.

Clearly by reason of the webs 32 and 36 of the rectangular sections providing an upwardly facing elongated flat area throughout the entire width of the trailer body, the stabilizer is one which can accommodate virtually any type of floor structure, and also can be placed at any appropriate location between front and rear ends of the body.

The wrench hold 76 is shown at the outer end of an end section of the shaft 70. The end section can, of course, be made of any appropriate length and cut off to whatever length may be appropriate in order to position the wrench hold 76 as near as may be feasible to the side panel of the trailer body, in that way to minimize projection of the shaft. All that is necessary is to have the wrench hold within reach of an appropriate wrench or crank applied from the side.

While a particular embodiment of the present invention has been shown and described, it will be obvious to those skilled in the art that changes and modifications may be made without departing from the invention in its broader aspects, and therefore the aim of its appended claims is to cover all such changes and modifications as fall within the true spirit and scope of this invention.

Having described the invention, what is claimed as new in support of Letters Patent is as follows:

1. A narrow body elongated adjustable length stabilizer apparatus for mounting transversely on the underside of a resiliently supported recreational vehicle of the type incorporating laterally disposed longitudinally side frame beams, said apparatus comprising:

first and second complementally shaped channels formed with proximal and distal ends, said channels being so constructed that the proximal end of said first channel telescopes in close fitting, load transmitting relationship with the proximal end of said second channel for telescoping relative thereto along an elongated axis, each said channel having a longitudinal channel and being formed with a respective top wall for engaging said underside of said recreational vehicle, oppositely disposed side walls and respective inturned bottom flanges cooperating with the respective said top wall to form respective first and second tracks for each channel and the flanges terminating in edges which are spaced apart to form an elongated downwardly opening passages in each of said channels;

first and second mounting means carried on the respective distal ends of said first and second channels for mounting to the underside of said side beams;

said channels having sufficient length and being so constructed that, when positioned under said vehicle, projecting transversely to said side beams, said channels may be telescoped to position said first and second mounting means in alignment under said respective side beams for anchoring thereto;

means for attaching the telescoped channels together to provide a transverse member of the length required for mounting said channels to said side beams to thereby provide a transverse support for said side beams;

respective first and second trunnion assemblies received in said respective first and second tracks, said trunnion assemblies including respective pairs of oppositely disposed pins including on their ends respective enlarged heads engaged on the respective flanges of said respective first and second channels and held captive between said respective flanges and said respective top walls, said assemblies including respective first and second open ended, threaded drive screw bores;

first and second elongated drive screws mounted rotatably in said respective channels and received screwably in said respective first and second threaded bores;

respective first and second pairs of linear braces pivotally connected on their upper ends to the respective distal ends of said first and second channels and projecting downwardly in respective planes extending parallel to said longitudinal axes of said channels and formed with respective pairs of first and second lower extremities;

first and second jack support legs carried on their respective top ends from said respective first and second trunnions and angling downwardly and outwardly therefrom through said respective channel passages toward said respective distal ends of said respective first and second channels and formed on their lower extremities with foot elements;

first and second pivot means connecting said respective first and second lower extremities of said respective braces to said respective first and second legs, whereby said apparatus may be placed in position under such recreational vehicle extending transversely thereunder, said first and second channels telescoped relative to each other to position said respective first and second mounting means in alignment under said respective side beams, and said drive screws rotated to advance said trunnions to lower the lower extremities of said jack support legs to engage said foot elements with the underlying surface and elevate said channels to engage said underside of said recreational vehicle to be held in position for anchoring of said mounting means to said respective beams.

* * * * *